United States Patent [19]
Yanagawa

[11] Patent Number: 5,610,883
[45] Date of Patent: Mar. 11, 1997

[54] OPTICAL PICKUP APPARATUS HAVING MEANS TO ELIMINATE CROSSTALK IN A FOCUS ERROR SIGNAL

[75] Inventor: Naoharu Yanagawa, Tokorozawa, Japan

[73] Assignee: Pioneer Electronic Corporation, Tokyo, Japan

[21] Appl. No.: 558,927

[22] Filed: Nov. 13, 1995

Related U.S. Application Data

[63] Continuation of Ser. No. 121,888, Sep. 17, 1993, abandoned.

[30] Foreign Application Priority Data

Sep. 30, 1992 [JP] Japan ................................ 4-262126

[51] Int. Cl.$^6$ ........................................... G11B 7/095
[52] U.S. Cl. ................................ 369/44.23; 369/44.32; 369/44.35; 369/44.41
[58] Field of Search ............................ 369/44.41, 44.42, 369/44.35, 44.36, 44.32, 44.23, 54, 58; 250/201.5

[56] References Cited

U.S. PATENT DOCUMENTS

| 4,074,204 | 2/1978 | Broburg et al. ................. 330/109 |
| 5,084,850 | 1/1992 | Yanagawa et al. .............. 369/44.41 |
| 5,189,651 | 2/1993 | Utsumi ........................... 250/201.5 X |

FOREIGN PATENT DOCUMENTS 0218250  4/1987  European Pat. Off. .

OTHER PUBLICATIONS

Patent Abstracts of Japan, vol. 14, No. 269 (P–1059) Jun. 11, 1990 & JP–A–02 076 134 (Mitsubishi Electric Corp) Mar. 15, 1990.
Patent Abstracts of Japan, vol. 011, No. 274 (P–612) Sep. 5, 1987 & JP–A–62 073 431 (Hitachi Ltd) Aug. 4, 1987.
Patent Abstracts of Japan, vol. 015, No. 455 (P–1277) Nov. 19, 1991 & JP–A–31 92 534 (Fujitsu Ltd) Aug. 22, 1991.

*Primary Examiner*—W. R. Young
*Attorney, Agent, or Firm*—Sughrue, Mion, Zinn, Macpeak & Seas

[57] ABSTRACT

An optical pickup apparatus which adds the result of synthesizing the outputs of the individual elements of a photosensor for tracking servo to the difference between the outputs of those diagonally arranged elements of a photosensor for focus servo, thus yielding a focus error signal. This design eliminates the need for filters which have conventionally been essential to separate and extract a crosstalk component from a focus error component. This optical pickup apparatus can therefore produce a focus error signal from which the crosstalk component is effectively eliminated.

4 Claims, 7 Drawing Sheets

OPTICAL PICKUP APPARATUS HAVING MEANS TO ELIMINATE CROSSTALK IN A FOCUS ERROR SIGNAL

This is a Continuation of application Ser. No. 08/121,888 filed Sep. 17, 1993, now abandoned.

BACKGROUND OF THE INVENTION

1. Field of the Invention

The present invention relates to an optical pickup apparatus in an optical recording medium player, and, more particularly, to an optical pickup apparatus which includes a focus error detector and a tracking error detector.

2. Description of the Related Art

In general, disk players which play an optical recording medium, such as an optical video disk or a digital audio disk, (hereinafter simply called "disk") inevitably require so-called focus servo and tracking servo to always converge an information reading light beam correctly on the recording surface of a disk. The focus servo controls the position of the objective lens in the direction of the optical axis of the objective lens, which irradiates a light beam on the recording surface of the disk, so as to reduce the positional error of the objective lens to;the focus position along the optical axis of the objective lens or reduce a focus error. The tracking servo controls the position of the objective lens, which irradiates a light beam on the recording surface of the disk, in the radial direction of the disk with respect to the recording tracks so as to reduce the positional error of the objective lens to the recording tracks or reduce a tracking error.

Figure 1:
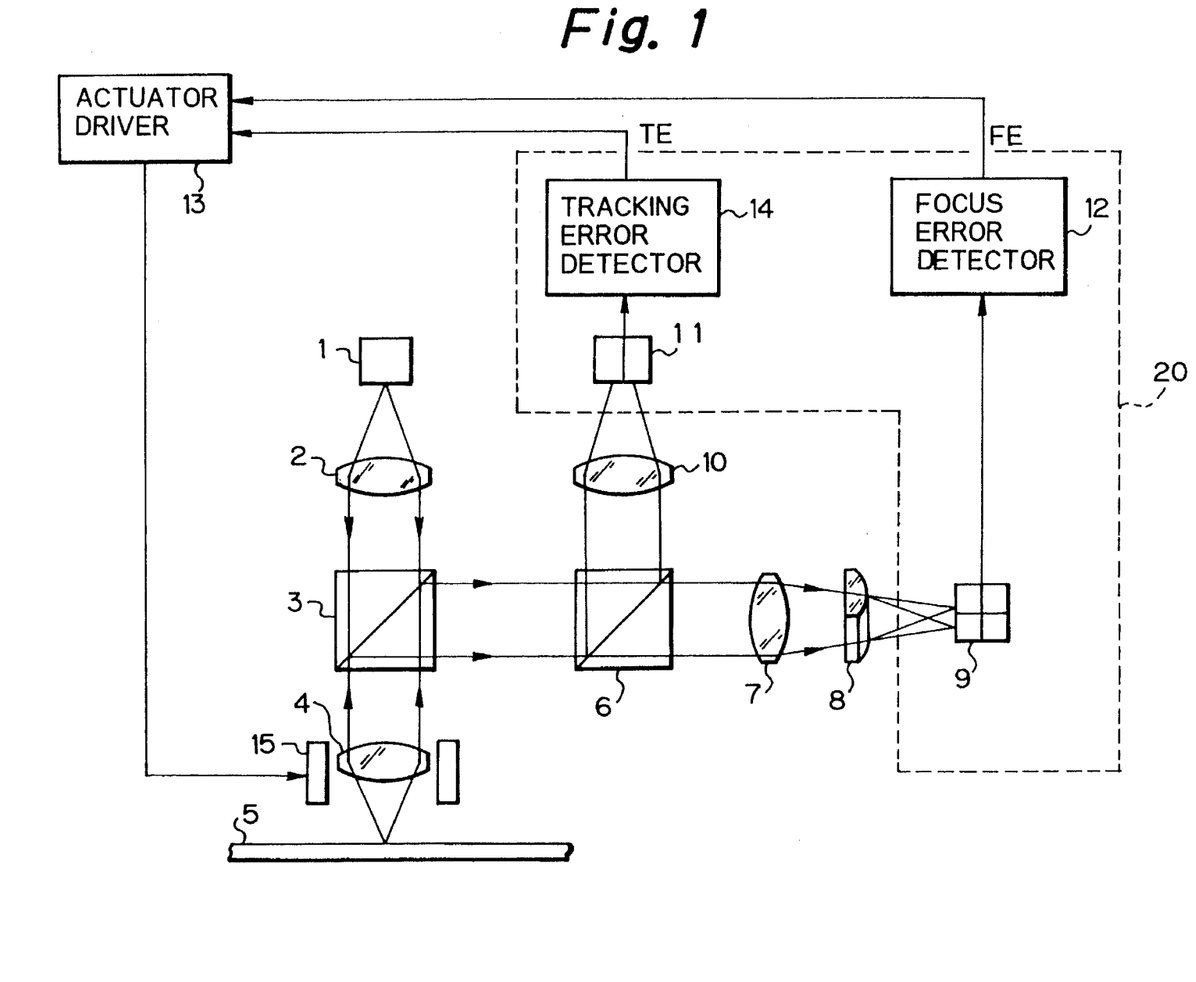
FIG. 1 is a diagram illustrating the structure of an optical pickup apparatus.

FIG. 1 illustrates the structure of an optical pickup apparatus including those servo systems.

Figure 2A:
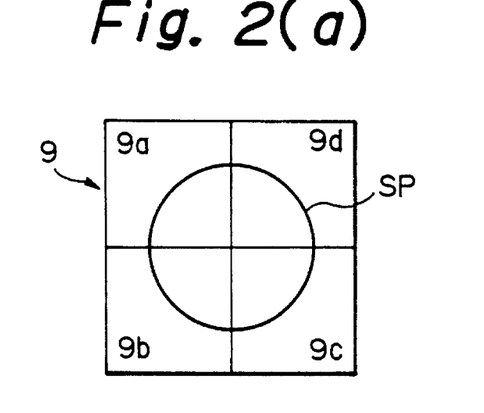
FIGS. 2(a), 2(b) and 2(c) are diagrams showing different shapes of a beam spot on the light-receiving surfaces of a photosensor.
Figure 2B:
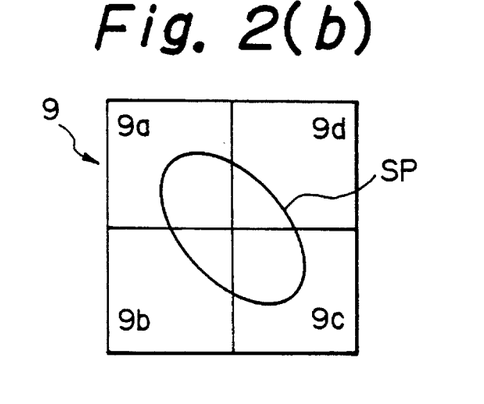
Figure 2C:
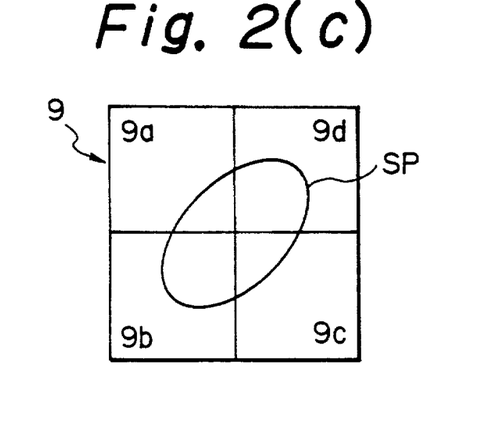

In the diagram, the laser beam from a semiconductor laser 1, which generates a single read beam, is converted into a parallel laser beam by a collimator lens 2. This parallel laser beam is irradiated via a beam splitter 3 to an objective lens 4. The objective lens 4 condenses this parallel laser beam into a focused laser beam and irradiates this beam toward an optical disk 5. This focused laser beam is reflected by the optical disk 5, and the thus reflected laser beam is converted into a parallel laser beam by the objective lens 4. The parallel laser beam enters the beam splitter 3 to be directed to a polarizing beam splitter (hereinafter, referred to as PBS) 6. The PBS 6 separates the light beam from the beam splitter 3 into P and S polarized lights. The P polarized light from the PBS 6 is condensed to be a focused laser beam by a detection lens 7. This focused laser beam passes through a cylindrical lens 8, forming a spot on four light-receiving surfaces of a quarter-split photosensor 9. The quarter-split photosensor 9 has four light-receiving surfaces defined by a pair of lines crossing perpendicularly to each other. Based on this focused laser beam, the cylindrical lens 8 generates an astigmatic beam. When the focused laser beam irradiated on the optical disk 5 by the objective lens 4 is in focus, the cylindrical lens 8 irradiates spot light SP of a true circle, as shown in FIG. 2(a), on the quarter-split photosensor 9. When the focused laser beam is out of focus, the cylindrical lens 8 irradiates ellipsoidal spot light SP as shown in FIG. 2(b) or 2(c) on the quarter-split photosensor 9. This spot light SP has an ellipsoidal shape in the diagonal direction of the elements of the photosensor 9. The S polarized light reflected by the PBS 6 passes through a detection lens 10, forming a spot on two light-receiving surfaces of a half-split photosensor 11. The two light-receiving surface of the photosensor 11 are defined by the line that bisecting the entire light-receiving surface of the photosensor 11. The quarter-split photosensor 9 photoelectrically converts individual portions of the spot light on the four light-receiving surfaces into electric signals and supplies the electric signals to a focus error detector 12. Based on those received electric signals, the focus error detector 12 produces a focus error signal (FE) and sends the error signal to an actuator driver 13. The half-split photosensor 11 photoelectrically converts individual portions of the spot light on the two light-receiving surfaces into electric signals and supplies the electric signals to a tracking error detector 14. Based on those received electric signals, the tracking error detector 14 produces a tracking error signal (TE) and sends the error signal to the actuator driver 13. The actuator driver 13 produces a focusing drive signal to move the objective lens 4 in accordance with the focus error signal, and produces a tracking drive signal to also move the objective lens 4 in accordance with the tracking error signal. The actuator driver 13 sends those drive signals to an actuator 15. The actuator 15 moves the objective lens 4 along the optical axis in accordance with the focusing drive signal, and moves the objective lens 4 in the radial direction of the recording tracks in accordance with the tracking drive signal.

Figure 3:
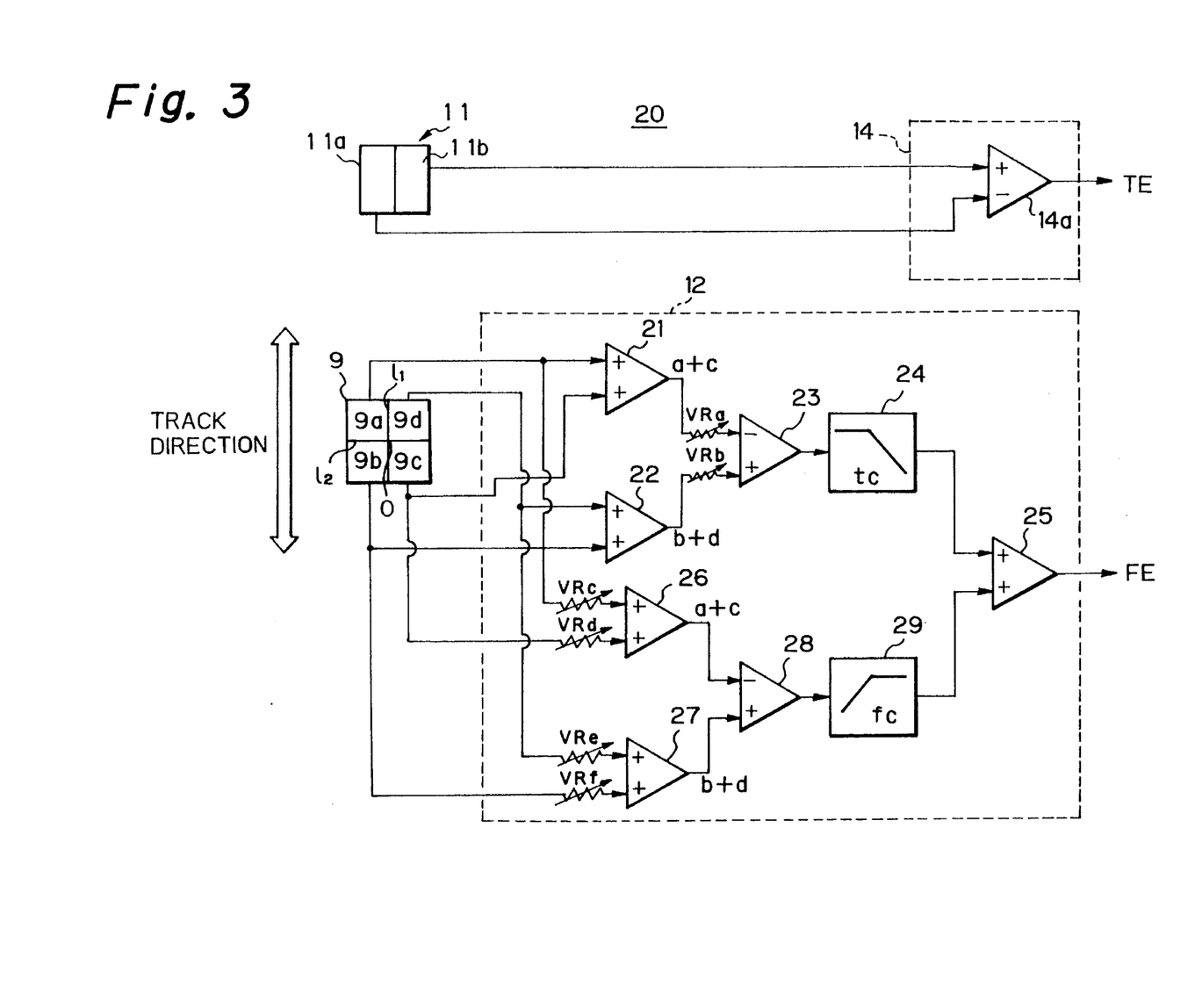
FIG. 3 is a diagram illustrating the structure of an error signal generator in the optical pickup apparatus.

FIG. 3 illustrates the structure of an error signal generator 20, which comprises the aforementioned quarter-split photosensor 9, half-split photosensor 11, focus error detector 12 and tracking error detector 14.

The tracking error detector 14 will be described first.

The half-split photosensor 11 comprises two independent elements 11a and 11b whose photoelectrically converted outputs are supplied to a differential amplifier 14a that constitutes the tracking error detector 14. The differential amplifier 14a produces a difference between the photoelectric conversion outputs from the elements 11a and 11b as the tracking error signal (TE). The bisecting line for the two elements of the half-split photosensor 11 optically matches with the track direction of the disk. When the laser beam is on a track, the amounts of light at the two light-receiving surfaces are equal to each other. When the laser beam is off a track, there is a difference between those light amounts at the two light-receiving surfaces.

Now the focus error detector 12 will be described.

The quarter-split photosensor 9 comprises four independent elements 9a to 9d, which are located adjoining to one another with two split lines $L_1$ and $L_2$ as boundaries. One of the lines, $L_1$, is parallel to the track direction. The photoelectric conversion outputs of the elements 9a and 9c, symmetrical to each other with respect to the center of the light-receiving surfaces 0 of the quarter-split photosensor 9, are added by an adder 21. Likewise, the photoelectric conversion outputs of the elements 9b and 9d, also symmetrical to each other with respect to that center O, are added by an adder 22. The added outputs of those adders 21 and 22 are supplied to a differential amplifier 23 respectively via variable resistors VRa and VRb. The differential amplifier 23 computes the difference between the signals supplied via the variable resistors VRa and VRb and sends a signal representing that difference to a low-pass filter (hereinafter, referred to as LPF) 24. The LPF 24 extracts a signal with a lower frequency than a predetermined cutoff point fc among the signal supplied from the differential amplifier 23, and sends the low-frequency signal to an adder 25. Further, the photoelectric conversion outputs of the elements 9a and 9c are supplied to an adder 26 respectively via variable resistors VRc and VRd, and the photoelectric conversion outputs of the elements 9b and 9d are supplied to an adder 27 respectively via variable resistors VRe and VRf. The adder 26 adds the signals received via the variable resistors VRc and VRd and sends a resultant sum signal to a differential amplifier 28. The adder 27 adds the signals received via the variable resistors VRe and VRf and sends a resultant sum signal to the differential amplifier 28. The differential amplifier 28 computes the difference between the signals from the adders 26 and 27, and sends a signal representing that difference to a high-pass filter (hereinafter, referred to as HPF) 29. The HPF 29 extracts a signal with a higher frequency than the predetermined cutoff point fc among the signal supplied from the differential amplifier 28, and sends the high-frequency signal to the adder 25.

The adder 25 adds the signals from the LPF 24 and HPF 29, and produces a resultant sum signal as the focus error signal (FE). The characteristics of the LPF 24 and the HPF 29 are complementary to each other, and the cutoff point fc is set sufficiently low with respect to the servo band such that the point may not affect the servo loops; for example, fc is set to about 10 Hz. On the low-frequency side, the focus balance is adjusted by the variable resistors VRa and VRb. On the high-frequency side, the level control is effected by the variable resistors VRc to VRf so that the levels of the outputs of the four elements become the same.

In the focus error detector 12, as described above, the photoelectric conversion outputs of every diagonally adjoining two of the four elements are added by the adders 21 and 22 (adders 26 and 27) respectively, and the difference between the results of those two additions is acquired by the differential amplifier 23 (differential amplifier 28), thus generating a focus error component. When the focused laser beam is in focus, the spot light of a true circle as shown in FIG. 2(a) is formed on the quarter-split photosensor 9. Therefore, the result of the addition of the photoelectric conversion outputs of one diagonal pair of elements among the four elements equals the result of the addition of the photoelectric conversion outputs of the other diagonal pair of elements, and the focus error component becomes "0". When the focused laser beam is out of focus, the ellipsoidal spot light as shown in FIG. 2(b) or 2(c) is formed on the quarter-split photosensor 9. Therefore, the result of the addition of the photoelectric conversion outputs of one diagonal pair of elements differs from the result of the addition of the photoelectric conversion outputs of the other diagonal pair of elements. Thus, the focus error component output from the differential amplifier 23 (differential amplifier 28) has a value corresponding to that focus deviation.

The thus produced focus error component is temporarily separated into a low-frequency component and a high-frequency component by the LPF 24 and HPF 29. At this time, as the focus error component has a relatively long fluctuation period, it is extracted as a low-frequency component by the LPF 24. There may occur a crosstalk component or noise which is produced by the signal superimposition when a beam spot traverses the tracks in a special mode, such as a scan or still mode. As the crosstalk component has a relative short fluctuation period, it is extracted as a high-frequency component by the HPF 29. Those crosstalk component and focus error signal component are added by the adder 25, yielding a final focus error signal (FE). Therefore, the above-described focus error detector can generate a focus error signal (FE) which is free of the crosstalk component or high-frequency noise which is superimposed on the recorded signal when a beam spot traverses the tracks in a special mode, such as a scan or still mode.

In the above-described conventional optical pickup apparatus, however, the crosstalk component may not be properly separated and extracted in some cases due to the phase shift of the filters themselves such as LPF 24 and HPF 29, which are used to extract the crosstalk component. Accordingly, the conventional apparatus cannot always produce a focus error signal free of such a crosstalk component.

SUMMARY OF THE INVENTION

It is therefore an object of the present invention to provide an optical pickup apparatus which produces a focus error signal free of a crosstalk component that is generated when a beam spot traverses the tracks.

To achieve this object, according to the present invention, there is provided an optical pickup apparatus comprising a light source for generating a single read beam; an optical system for separating, from the read beam, a reflected beam that is the read beam reflected at a recording medium; a beam splitter for separating the reflected beam into a tracking beam and a focus beam; and error signal generating means for receiving the tracking beam and the focus beam and generating a tracking error signal and a focus error signal, the error signal generating means including a first photosensor for receiving the tracking beam, a second photosensor for receiving the focus beam via an astigmatic beam generating element, a tracking error detector for producing a difference between outputs of those elements of the first photosensor which are aligned perpendicular to a track direction, as the tracking error signal, synthesizing means for synthesizing outputs of the individual elements of the first photosensor through a predetermined operation, and a focus error detector for adding an output of the synthesizing means to a difference between outputs of those elements of the second photosensor which are arranged on respective diagonal lines, yielding the focus error signal.

In the optical pickup apparatus of this invention, a signal obtained by synthesizing the outputs of the individual elements of the tracking servo photosensor is added to a signal representing the difference between the output of the diagonally arranged elements of the focus servo photosensor and that of the other diagonally arranged elements, and the resultant signal is used as the focus error signal.

DETAILED DESCRIPTION OF THE PREFERRED EMBODIMENTS

Preferred embodiments of the present invention will now be described referring to the accompanying drawings.

Figure 4:
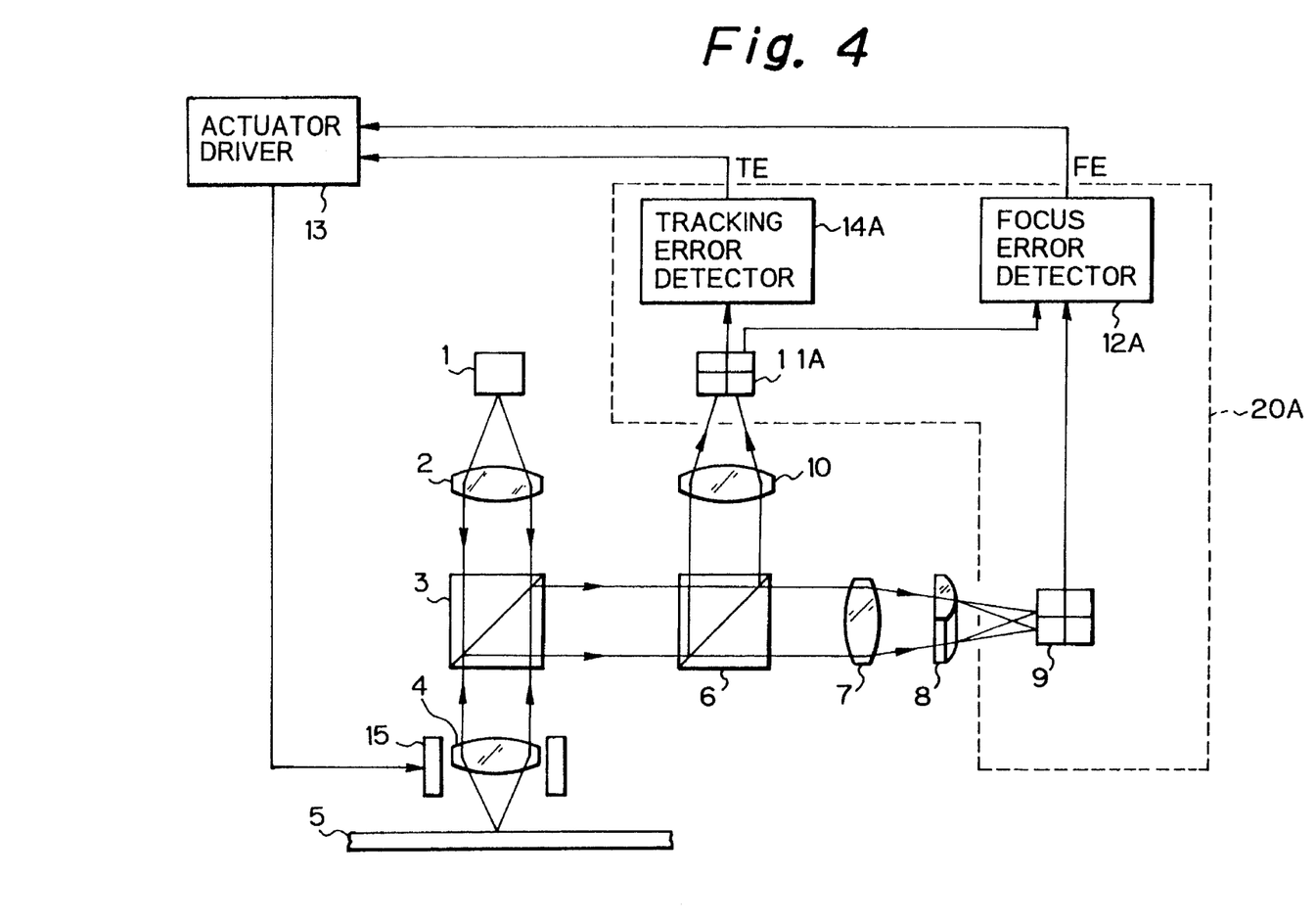
FIG. 4 is a diagram illustrating the structure of an optical pickup apparatus embodying the present invention.

FIG. 4 illustrates the structure of an optical pickup apparatus embodying the present invention.

This optical pickup apparatus in FIG. 4 is the same as the one shown in FIG. 1, except for an error signal generator 20A, which comprises a quarter-split photosensor 11A, a focus error detector 12A and a tracking error detector 14A. Therefore, the description of the other identical portions will not be given below.

Figure 5:
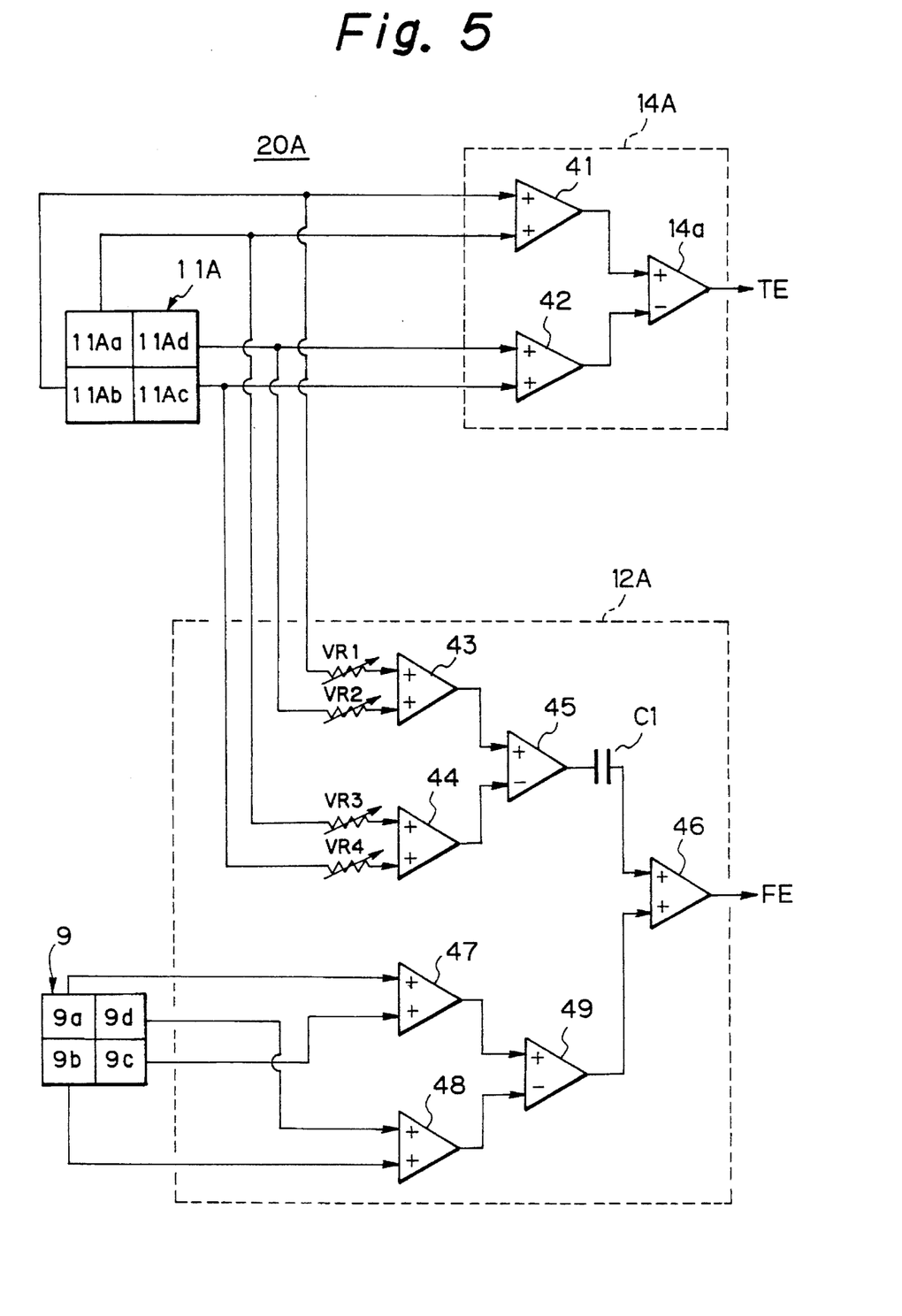
FIG. 5 is a diagram illustrating the structure of an error signal generator in the optical pickup apparatus of this invention.

FIG. 5 illustrates the constitution of the error signal generator 20A in the optical pickup apparatus of this invention.

The quarter-split photosensor 11A and the tracking error detector 14A will be described first.

The quarter-split photosensor 11A comprises four elements 11Aa to 11Ad which are independent to one another. The individual photoelectric conversion outputs from the elements 11Aa and 11Ab of the quarter-split photosensor 11A are added by an adder 41. The individual photoelectric conversion outputs from the elements 11Ac and 11Ad are added by an adder 42. The sum outputs of those adders 41 and 42 are supplied to a differential amplifier 14a. The differential amplifier 14a computes the difference between the signals from the adders 41 and 42 and produces a signal representing the difference as a tracking error signal (TE). The output of the adder 41 is equal to the photoelectric conversion output of the element 11a of the half-split photosensor 11 in FIG. 3, and the output of the adder 42 is equal to the photoelectric conversion output of the element 11b of this half-split photosensor 11. In other words, the constitution having the quarter-split photosensor 11A and the tracking error detector 14A has the same function as the constitution that has the half-split photosensor 11 and tracking error detector 14 shown in FIG. 3.

Next, the focus error detector 12A will be described below.

The individual photoelectric conversion outputs from the quarter-split photosensor 11A are supplied to the focus error detector 12A as well as the tracking error detector 14A. The photoelectric conversion outputs of the elements 11Ab and 11Ad of the quarter-split photosensor 11A are supplied to an adder 43 respectively via variable resistors VR1 and VR2. The photoelectric conversion outputs of the elements 11Aa and 11Ac of the quarter-split photosensor 11A are supplied to an adder 44 respectively via variable resistors VR3 and VR4. The adder 43 adds the signals supplied via the variable resistors VR1 and VR2 and sends a resultant sum signal to a differential amplifier 45. The adder 44 adds the signals supplied via the variable resistors VR3 and VR4 and sends a resultant sum signal to a differential amplifier 45. The differential amplifier 45 computes the difference between the signals from the adders 43 and 44 and supplies a resultant difference signal to a capacitor C1. The capacitor C1 eliminates a DC component from the signal from the differential amplifier 45 and sends a resultant signal to an adder 46. The photoelectric conversion outputs of elements 9a and 9c of a quarter-split photosensor 9 are sent to an adder 47, and the photoelectric conversion outputs of the other elements 9b and 9d of the photosensor 9 are sent to an adder 48. The adder 47 adds the photoelectric conversion outputs from the elements 9a and 9c and sends a resultant sum signal to a differential amplifier 49. The adder 48 adds the photoelectric conversion outputs from the elements 9b and 9d and sends a resultant sum signal to the differential amplifier 49. The differential amplifier 49 computes the difference between the signals from the adders 47 and 48 and supplies a resultant difference signal to the adder 46. The adder 46 adds the signals, respectively supplied from the capacitor C1 and the differential amplifier 49, and produces a resultant sum signal as a focus error signal (FE).

In the above-described focus error detector 12A, a focus error component is produced by the structure, which comprises the quarter-split photosensor 9, the adders 47 and 48 and the differential amplifier 49, a crosstalk component is extracted by the structure, which comprises the quarter-split photosensor 11A for detection of a tracking error, the adders 43 and 44, the differential amplifier 45 and the capacitor C1, the focus error component and crosstalk component are added by the adder 46, and the resultant signal is output as the focus error signal (FE).

According to this invention, the crosstalk component contained in the focus error signal is extracted from the photosensor for the detection of a tracking error and is then eliminated. This invention can therefore provide a focus error signal (FE) from which the crosstalk component is eliminated more effectively than done by the optical pickup apparatus which extracts the crosstalk component from the focus error component through filters.

Incidentally, the photoelectric conversion outputs of one diagonal pair of elements among the four elements of the quarter-split photosensor 11A are added by the adder 43 and the photoelectric conversion outputs of the other diagonal element pair are added by the adder 44 in the focus error detector 12A in FIG. 5, the addition of photoelectric conversion outputs is not limited to this particular type. The combination of additions may arbitrarily be altered in accordance with the aberration of the detection lens 7 and the cylindrical lens 8 or the rotation deviation between the quarter-split photosensor 11A for tracking error detection and the quarter-split photosensor 9 for focus error detection. For some disks, the amount of crosstalk may be small, in which case the crosstalk should not necessarily be eliminated. In the focus error detector 12A in FIG. 5, the DC component is removed from the output of the differential amplifier 45 by the capacitor C1 so that the output of the differential amplifier 45 is sent to the adder 46 under the same condition as the output of the differential amplifier 49 which contains no DC component. The capacitor C1 may be omitted, in which case a DC component should be superimposed on the output of the differential amplifier 49.

Figure 6:
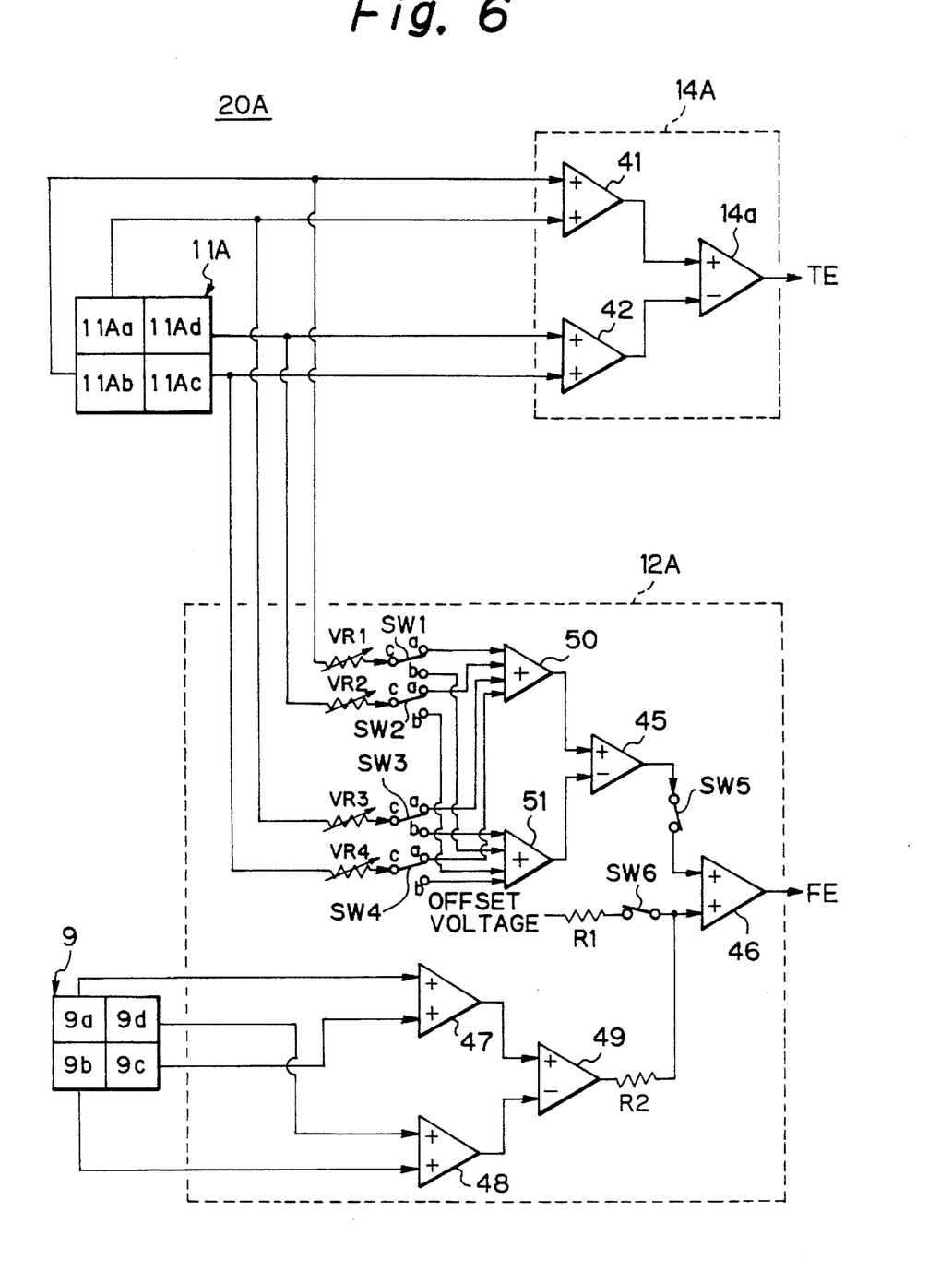
FIG. 6 is a diagram illustrating the structure of an error signal generator according to another embodiment of this invention.

FIG. 6 illustrates the structure of the error signal generator 20A according to another embodiment of this invention designed in view of the above points.

In the diagram, the outputs of the variable resistors VR1 to VR4 are respectively supplied to fixed contacts c of changeover switches SW1 to SW4. The outputs from movable contacts a of the switches SW1 to SW4 are supplied to an adder 50 and the outputs from movable contacts b of those switches are supplied to an adder 51. The outputs of the adders 50 and 51 are designed to be supplied to the differential amplifier 45, and the combination of additions to extract the crosstalk component can be altered by properly switching the switches SW1 to SW4. For instance, when the switches SW1 and SW4 are set to the movable contacts a and the switches SW2 and SW3 are set to the movable contacts b, the output of the differential amplifier 45 becomes (output of 11Ab+output of 11Ac)−(output of 11Aa+output of 11Ad). With those switching states, the difference between the result of the addition of the photoelectric conversion outputs of the adjoining two elements and the result of the addition of the photoelectric conversion outputs of the other adjoining two elements is obtained to extract the crosstalk component. The differential amplifier 45 obtains the difference between the results of the additions in the adders 50 and 51 in the constitution of FIG. 6. It should be noted, however, that the differential amplifier 45 may be changed to an adder, with an inverting amplifier or the like connected to the output of the adder 50 or 51. Further, in the apparatus shown in FIG. 6, a switch SW5 is connected to the output of the differential amplifier 45 so that opening of this switch SW5 disables the crosstalk eliminating function. Furthermore, a predetermined offset voltage is applied via a resistor R1 and a switch SW6 to the output line of the differential amplifier 49 to superimpose a DC component on the output of the differential amplifier 49. This switch SW6 functions in an interlocked manner with the switch SW5, so that the switch SW6 is also open when the crosstalk elimination is not effected.

Although the photosensor for tracking error detection has four light-receiving surfaces in this embodiment, the photosensor is not limited to this quarter-split type, but may be accomplished by a half-split type photosensor.

Figure 7:
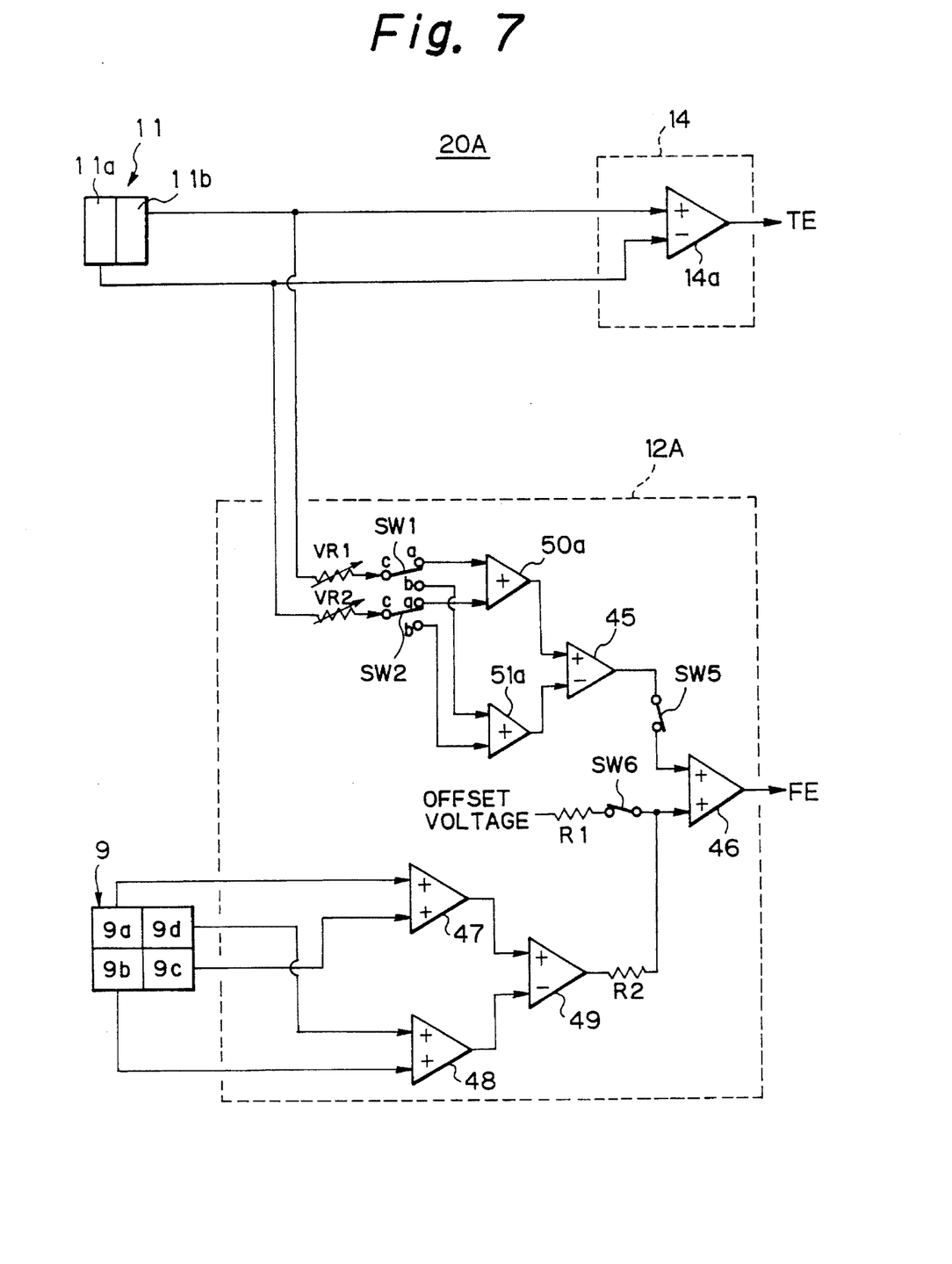
FIG. 7 is a diagram illustrating the structure of an error signal generator according to a further embodiment of this invention.

FIG. 7 illustrates the constitution of the error signal generator 20A according to a further embodiment of this invention which is adapted for the case where the photosensor for tracking error detection is a half-split photosensor.

The structure in FIG. 7 can eliminate that crosstalk component appearing on the focus error signal which is in phase with the outputs of two elements 11a and 11b of the half-split photosensor 11.

As described above, the optical pickup apparatus embodying this invention is designed to extract a crosstalk component based on the signal from the photosensor for tracking servo to thereby eliminate the crosstalk component from the focus error signal. This invention can therefore produce a focus error signal from which the crosstalk component is effectively eliminated without any influence of the phase shift of filters themselves, which is inevitable in the optical pickup apparatus that separates and extracts the crosstalk component through the filters.

What is claimed is:

1. An optical pickup apparatus comprising:

a light source for generating a single read beam;

an optical system for separating, from said read beam, a reflected beam that is said read beam reflected at a recording medium;

a beam splitter for separating said reflected beam into a first non-astimatic beam and a second non-astigmatic beam;

a first photosensor for receiving said first non-astigmatic beam;

a cylindrical lens for converting said second non-astigmatic beam to an astigmatic beam;

a second photosensor for receiving said astigmatic beam;

a tracking error detector for producing a difference between outputs of those elements of said first photosensor which are aligned perpendicular to a track direction, as said tracking error signal;

synthesizing means for synthesizing outputs of the individual elements of said first photosensor through a predetermined operation, thereby obtaining a crosstalk component; and a focus error detector for adding said crosstalk component to a difference between outputs of those elements of said second photosensor which are arranged on respective diagonal lines, yielding said focus error signal.

2. The optical pickup apparatus according to claim 1, wherein said predetermined operation consists of addition or subtraction, and said synthesizing means includes selecting means for arbitrary selecting said addition or said subtraction for each of said elements of said first photosensor to perform a synthesizing operation.

3. The optical pickup apparatus according to claim 1, wherein said first photosensor comprises four independent elements.

4. The optical pickup apparatus according to claim 1, further comprising a capacitor for eliminating a DC component from an output of said synthesizing means.

\* \* \* \* \*